3,069,229
PRODUCTION OF SODIUM BORATES
Nelson P. Nies, Laguna Beach, and Kenneth K. Kendall, Jr., Anaheim, Calif., assignors to United States Borax & Chemical Corporation, Los Angeles, Calif., a corporation of Nevada
No Drawing. Filed May 13, 1960, Ser. No. 28,831
5 Claims. (Cl. 23—59)

The present invention relates as indicated to the production of sodium borates and has more particular reference to an improved "wet process" for producing sodium borates.

Most commercial sodium borates as, for example, sodium tetraborate decahydrate (borax) and sodium tetraborate pentahydrate are produced from ores containing crude borates combined with a gangue and small amounts of various impurities, among which calcium salts are particularly troublesome impurities.

The common method for the recovery of the sodium borates is a "wet process" in which the ore is crushed and is treated in a dissolver with water or a mother liquor containing sodium borate. It is to be clearly understood that it is immaterial to the present invention whether the crushed ore is dissolved in plain water or a mother liquor containing sodium borate dissolved therein, it being only necessary to the invention that an aqueous medium is used. The sodium borate dissolves in the water or mother liquor and is separated from the gangue as by settling and/or filtration and the desired sodium borate is then separated from the clarified solution by crystallization. The solutions of sodium borate ores contain on the order of from about 300 to 700 parts per million of calcium oxide which tends to deposite calcium compounds in the pipe lines and presents a problem in the transferring of the sodium borate solution from the dissolving unit to the crystallizing unit.

Sodium borate solutions containing in excess of about 40 parts per million calcium oxide tend to deposit calcium salts in pipe lines, and in a comparatively short period of time the deposits are so great as to completely stop the flow of solution through the pipe lines. Cleaning the deposits from the pipe lines requires stopping the entire process and results in considerable production losses.

It is, therefore, the principal object of the present invention to provide a "wet process" for the production of sodium borates wherein calcium deposition is virtually eliminated.

It is a further object of this invention to provide a method for removing calcium from sodium borate solutions which is efficient and economically desirable.

Other objects will appear as the description proceeds.

To the accomplishment of the foregoing and related ends, said invention then comprises the features hereinafter fully described and particularly pointed out in the claims, the following description setting forth in detail certain illustrative embodiments of the invention, these being indicative, however, of but a few of the many ways in which the principle of the invention may be employed.

Broadly stated, the present invention comprises the method for producing sodium borates which comprises dissolving a sodium borate ore in an aqueous medium and introducing water-soluble carbonate ions into the resultant mass comprising undissolved gangue and sodium borate and calcium salts in solution; separating the undissolved gangue from the sodium borate-calcium solution, adding calcium carbonate to said solution, allowing said calcium carbonate to settle whereby the calcium in said solution is carried down with said calcium carbonate, separating the resultant sodium borate solution from said settled calcium carbonate and crystallizing sodium borate from said solution.

It will be noted that any source of carbonate ion which is soluble in water can be used in the present process. The following list is illustrative of materials which may be used to introduce the carbonate ion:

Sodium carbonate
Carbon dioxide
Sodium bicarbonate
Sodium sesquicarbonate

The addition of carbonate ion can be performed at any time prior to the addition of calcium carbonate; however, in the preferred embodiment of the invention we add the carbonate ion during or before dissolving the ore. Thus, if carbon dioxide is used, the dissolving unit can act as a carbonating tower and if other soluble sources of carbonate ions are used they can be added dry to the ore before entering the dissolver and thus save the cost of expensive mixing equipment.

Carbonate ion is added in such proportion that the weight of carbonate ion is equivalent to from about 0.5% to about 2.5% of the weight of solution. In this manner the calcium oxide concentration of the solution is lowered from 300 to 700 parts per million to about 90 to 150 parts per million. However, as stated previously, the calcium oxide content preferably should be below about 40 parts per million to substantially eliminate calcium deposition and this is accomplished by the addition of calcium carbonate to the clarified solution.

The addition of about 1% to about 4% of calcium carbonate to the sodium borate solution contaminated with the remaining calcium is an effective, economical and rapid method for removing such remaining calcium. Although the exact mechanism by which this process works, whether it is coprecipitation or a physical entrapment phenomenon, is not fully understood; nevertheless the fact remains that the calcium oxide concentration is lowered from 90 to 150 parts per million to below 40 parts per million, usually in less than 15 minutes. The calcium carbonate can be added to unclarified sodium borate solution; however, in the preferred embodiment of the invention we add it to the clarified solution so that upon separating it from the solution the calcium carbonate can be recovered and reused.

So that the present invention is more clearly understood, the following examples are given for illustrative purposes:

A large sample of ore was crushed, intimately mixed and the ore used in each of the following examples was taken from this source of supply. A control sample was prepared to determine the calcium oxide content of a sodium borate solution prepared from the ore without calcium carbonate or soluble carbonate ion addition.

(I)

The control solution was prepared in the following manner:

(1) Ore was dissolved in mother liquor at 95° C. This mother liquor is the same as used in commercial production and comprises about a 27% aqueous solution of sodium borate. The same concentration of mother liquor was used in all of the following examples, except Example VI which used plain water to dissolve the ore.

(2) The mud and solution were decanted from the coarse gangue.

(3) The mud was allowed to settle and the solution and mud were then separated by filtration.

(4) A sample of the clarified solution was analyzed. Chemical analysis yielded the following data:

CaO content _____ 450 parts per million (II)

Sodium carbonate was blended with a portion of the above ore and dissolved in mother liquor at 95° C. to yield a solution having an initial concentration of 48.4% sodium tetraborate decahydrate and 1.1% $CO_2$. 9.0% calcium carbonate was then added to the solution with stirring. After 15 minutes a sample of the solution was removed and clarified for analysis. Chemical analysis yielded the following data:

|  | P.p.m. |
|---|---|
| CaO content of solution without carbonate ion addition | 450 |
| CaO content after $CaCO_3$ addition to solution containing carbonate ions | 35 |

(III)

Sodium bicarbonate was blended with a portion of the above ore and dissolved in mother liquor at 95° C. to yield a solution having an initial concentration of 43.7% sodium tetraborate decahydrate and 2.1% $CO_2$. 3.3% calcium carbonate was then added to clarified solution with stirring and after 15 minutes a sample of the solution was removed, filtered and analyzed. Chemical analysis yielded the following data:

|  | P.p.m. |
|---|---|
| CaO content of solution without carbonate ion addition | 450 |
| CaO content after $CaCO_3$ addition to solution containing carbonate ions | 17 |

(IV)

The process of Example II was repeated except that an equimolar mixture of sodium carbonate and sodium bicarbonate were blended with the ore and the initial concentration of the solution was 41.9% sodium tetraborate decahydrate and 2.1% $CO_2$. Chemical analysis yielded the following data:

|  | P.p.m. |
|---|---|
| CaO content of solution without carbonate ion addition | 450 |
| CaO content after $CaCO_3$ addition to solution containing carbonate ions | 11 |

V

A portion of the same ore was dissolved in mother liquor containing 2.1% $CO_2$ and having a temperature of about 95° C. The solution and mud were then decanted from the coarse gangue. The concentration of sodium tetraborate decahydrate in solution was 42.7%. The mud was allowed to settle and clear solution was obtained by decantation. 3.3% calcium carbonate was then added with stirring and after 15 minutes the solution was sampled. Chemical analysis yielded the following data:

|  | P.p.m. |
|---|---|
| CaO content of solution without carbonate ion addition | 450 |
| CaO content after $CaCO_3$ addition to solution containing carbonate ions | 25 |

(VI)

Example III was repeated using water rather than mother liquor to dissolve the ore. The initial concentration of the solution was 42.3% sodium tetraborate decahydrate and 2% $CO_2$. The results of the chemical analyses were comparable to those of Example III.

Other modes of applying the principle of the invention may be employed, change being made as regards the details described, provided the features stated in any of the following claims or the equivalent of such be employed.

We, therefore, particularly point out and distinctly claim as our invention:

1. In the method for the recovery of sodium tetraborate from a sodium borate ore containing calcium salts as an impurity by dissolving said ore in an aqueous medium, separating undissolved gangue from said solution, and crystallizing sodium tetraborate from said clarified solution, the improvement which consists of the steps
    (1) adding a member of the group consisting of carbon dioxide and the water-soluble sodium carbonates in such proportion as to provide a carbonate ion concentration equivalent to from about 0.5% to 2.5% of the weight of the solution,
    (2) adding about 1% to about 4% of calcium carbonate to said solution,
    (3) allowing said calcium carbonate to settle, whereby the calcium in said solution is carried down with said calcium carbonate, and
    (4) separating said settled calcium carbonate from said solution, thereby providing a sodium borate solution having a calcium oxide content of less than 40 parts per million;
in which said improvement steps are prior to crystallizing sodium tetraborate from said clarified solution.

2. The method of claim 1 wherein the carbonate ion is introduced as carbon dioxide.

3. The method of claim 1 wherein the carbonate ion is introduced as sodium carbonate.

4. The method of claim 1 wherein the carbonate ion is introduced as sodium bicarbonate.

5. The method of claim 1 wherein the carbonate ion is introduced as sodium sesquicarbonate.

References Cited in the file of this patent

UNITED STATES PATENTS

| 1,468,366 | Kelly | Sept. 18, 1923 |
| 1,847,836 | Kelly | Mar. 1, 1932 |
| 2,395,567 | May et al. | Feb. 26, 1946 |